Patented June 11, 1940

2,204,157

UNITED STATES PATENT OFFICE 2,204,157

CATALYST AND METHOD OF PRODUCING THE SAME

Waldo L. Semon, Silver Lake, Ohio, assignor to The B. F. Goodrich Company, New York, N. Y., a corporation of New York No Drawing. Application August 16, 1938, Serial No. 225,197

8 Claims. (Cl. 23—236)

This invention relates to catalysts and particularly to catalysts for use in dehydrating alcohols and to methods of preparing such catalysts.

Processes for catalytically dehydrating alcohols are well known. In many such processes, the alcohol in a vaporous state is passed over an appropriate catalyst heated to a suitable temperature for effecting the dehydration, and the dehydration products are separated according to conventional procedures.

I have discovered a new catalyst for use in such processes which may be simply and economically prepared and which has proved to be unusually effective in producing high yields of the desired dehydration product at temperatures lower than those heretofore commonly employed in the dehydration. The new catalyst is a complex mixture of various phosphates of a suitable metal, preferably aluminum, the exact constitution of which has not been determined. The complexity of the catalyst has been shown, however, by analyses which indicate that the metal and the phosphorus are not present in any simple ratio which would be the case in a pure aluminum phosphate.

As the catalyst has not been identified analytically and as the unusual activity of the catalyst appears to result at least in part from the peculiar physical structure produced by the procedure hereinafter described, the invention must be described with reference to the procedure employed in its preparation.

In preparing a catalyst according to a specific example illustrative of the present invention, a mixture of 875 grams of phosphoric acid, 80 c. c. of concentrated nitric acid and 400 c. c. of distilled water is heated to boiling temperature, and 227 grams of aluminum hydroxide are added slowly with stirring and intermittent heating until solution of the aluminum hydroxide is complete. 2000 c. c. of distilled water are then added and the solution is cooled to room temperature. Sufficient ammonium hydroxide (28%) is then added to make the solution alkaline to litmus when tested fifteen minutes after addition of the ammonia. 700 to 850 c. c. of ammonium hydroxide usually will be required. The resulting complex precipitate is separated from the solution by filtration with the aid of suction, the filter cake is redispersed in 2000 c. c. of slightly ammoniacal water, and again filtered with the aid of suction. The redispersion and refiltration operations are repeated twice more to remove substantially all water-soluble materials from the complex precipitate. Preferably, although not necessarily, approximately 8 to 10% by weight of a lubricant is added to the precipitate to facilitate pelleting and the cake is dried and formed into pellets according to conventional methods. Such lubricant may be glycerine, ethylene glycol, petroleum oil or the like but preferably is the alcohol which is to be dehydrated if it possesses lubricating properties. For example, in dehydrating 1,3-butanediol to produce butadiene, butanediol may be employed as the lubricant for the catalyst.

The lubricant and the pelleting operations may be omitted entirely, of course, in which case the filtered complex precipitate will be simply dried and broken into lumps of fairly small size, for example about ⅛" to ¼" in average diameter and used in that form as the dehydration catalyst.

Using the preferred complex material prepared as hereinabove described as the catalyst for producing butadiene from 1,3-butanediol by the conventional process of passing a vaporized solution of the butanediol over the catalyst in a heated condition, yields of butadiene of 75% of the theoretical yield have been obtained at operating temperatures of only 285° C. To indicate the superiority of the present catalyst, it may be noted that the use of activated alumina catalyst in the same process operating at an optimum temperature of around 325° C. produced a yield of only 30% of the theoretical.

The aluminum hydroxide used in the foregoing specific examples may be replaced by other aluminum compounds soluble in acids, such as aluminum oxide, aluminum nitrate, aluminum chloride, aluminum sulfate, and the like or by similar compounds of other metals including zinc, iron, manganese, cadmium, copper, magnesium, calcium, barium and strontium. The quantity of acid used will of course be varied as required to dissolve the particular metallic compound employed and the quantity of ammonia added to neutralize the acid will be varied correspondingly. In using a metal salt readily soluble in a phosphoric acid solution the nitric acid used in the specific example may be entirely dispensed with. It is also possible to neutralize mixtures of such metallic compounds rather than a single metallic compound for producing a complex phosphate precipitate.

The activity and efficiency of the complex metallic phosphate catalyst may be further increased by incorporating from 1 to 25% of a catalyst promoter such as powdered red phosphorus, graphite, phosphoric acid, secondary calcium phosphate, copper sulfate, thorium oxide, vanadium oxide, and tungstic oxide or other promoters of catalysts well known in the art as well as any desired mixture or combination of such promoters. Such promoters ordinarily may be simply mixed with the filtered complex phosphate precipitate before it is dried, but in the case of certain promoters particularly thorium oxide, direct admixture of the promoters with the precipitate renders the mixture undesirably fluffy. In such cases, the promoting compound may be precipitated with the complex phosphates, as for example, by adding a solution of a thorium salt to the acid solution of the metal prior to its neutralization with ammonia. Addition of from 5 to 10% such promoters to the complex phosphate catalysts ordinarily increases the activity or efficiency of the catalyst by about ten percent.

Although the invention has been described in considerable detail with reference to a preferred procedure and in connection with certain preferred specific materials and proportions of materials it will be understood that considerable variation and modification therein is possible without departing from the spirit and scope of the invention as defined by the appended claims.

I claim:

1. The method of producing a catalyst for use in dehydrating alcohols, which comprises preparing a solution containing phosphoric acid and a compound of aluminum, adding ammonia until a precipitate of complex aluminum phosphates is formed, separating the precipitate from the solution, washing water-soluble material from the precipitate and drying the washed precipitate.

2. The method of producing a catalyst for use in dehydrating alcohols, which comprises preparing a solution containing phosphoric acid and a compound of aluminum, completely neutralizing the solution with ammonia, separating the resulting precipitate from the solution, washing water-soluble material from the precipitate, and drying the washed precipitate.

3. The method of producing a catalyst for use in dehydrating alcohols, which comprises dissolving a compound of aluminum in a mixture of phosphoric acid and nitric acid, adding ammonia until a precipitate of complex aluminum phosphates is formed, separating the precipitate from the solution, washing water-soluble material from the precipitate and drying the washed precipitate, mixing a lubricant with the precipitate and forming it into pellets.

4. A catalyst for use in dehydrating alcohols produced according to the method defined by claim 1.

5. A catalyst for use in dehydrating alcohols produced according to the method defined by claim 2.

6. A catalyst for use in dehydrating alcohols produced according to the method defined by claim 3.

7. A pelleted catalyst for use in dehydrating 1.3 butanediol comprising precipitated complex phosphates of a metal selected from the class consisting of aluminum, zinc, iron, manganese, cadmium, copper, magnesium, calcium, barium and strontium, and a lubricant comprising 1.3 butanediol.

8. A pelleted catalyst comprising a solid catalytic material which will catalyse the dehydration of 1.3 butanediol, and a substantial quantity of 1.3 butanediol as a lubricant.

WALDO L. SEMON.